Sept. 3, 1957  W. W. HALLINAN  2,804,839
AIR FILTER ALARM SYSTEMS AND AIR FILTER ALARM UNITS
Filed Dec. 14, 1954  4 Sheets-Sheet 1
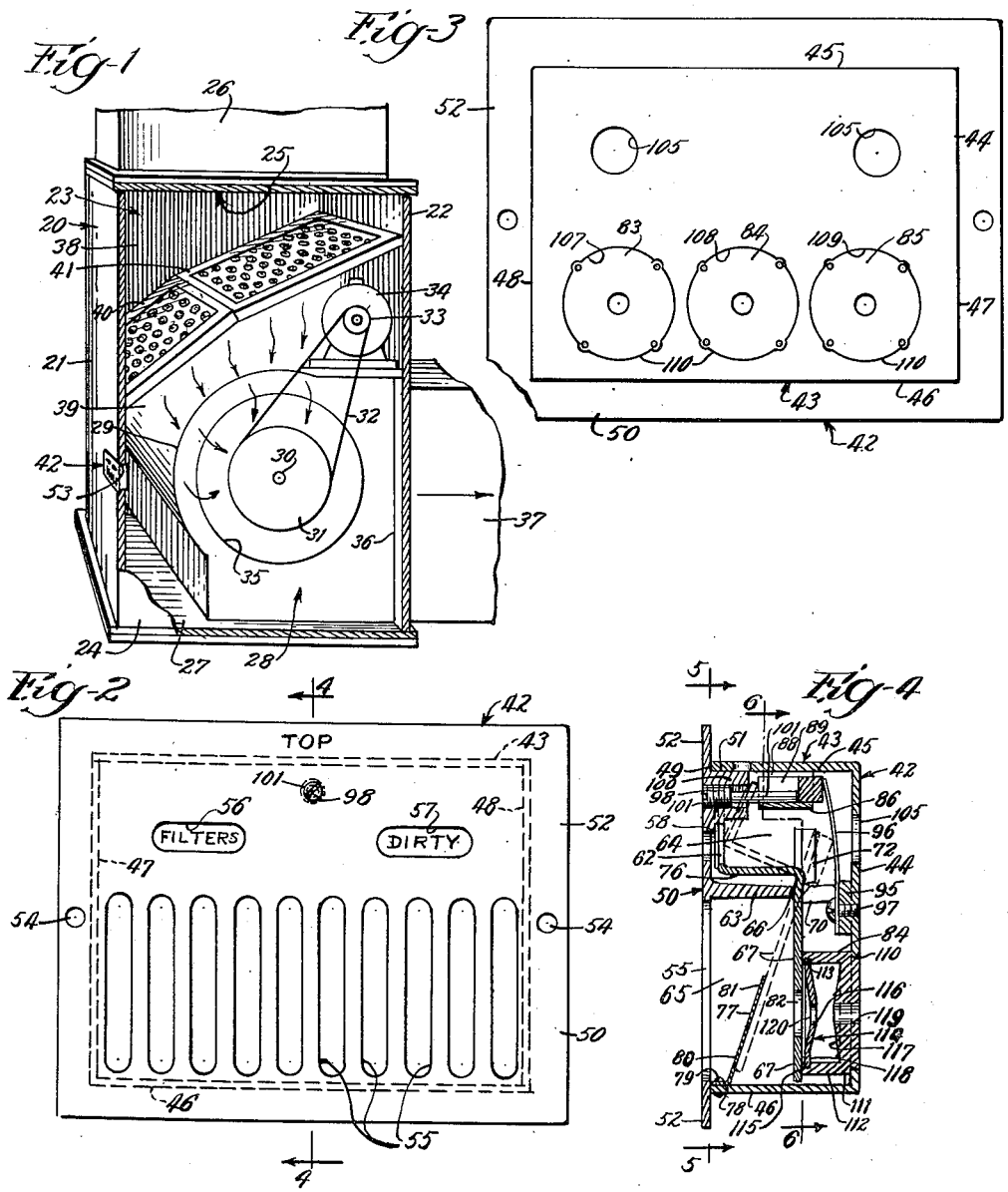
INVENTOR.
William W. Hallinan
BY
Robert H. Wendt
Atty.

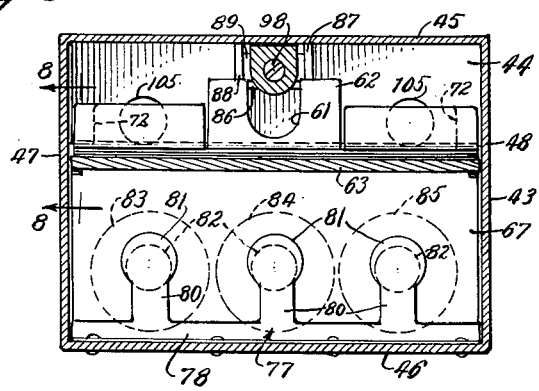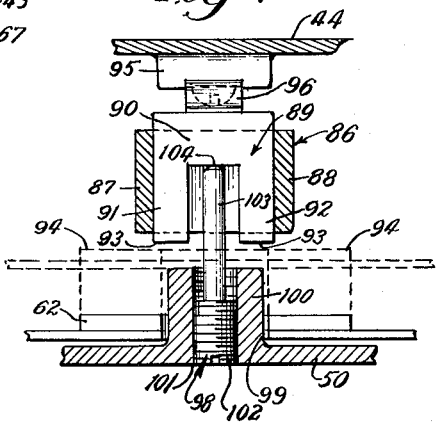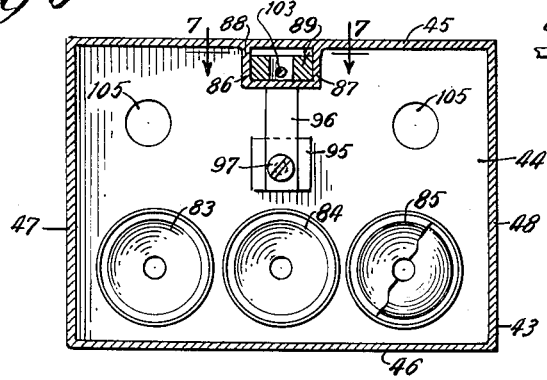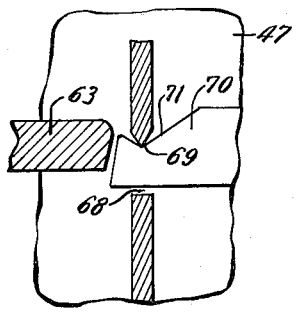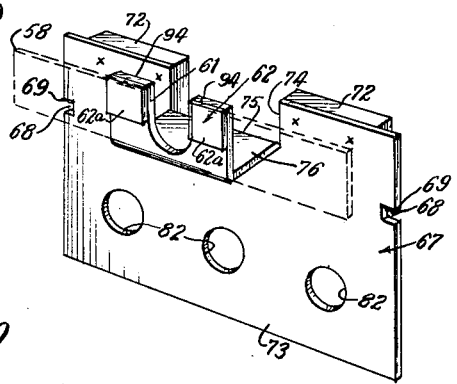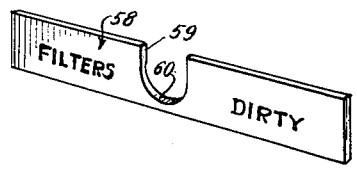

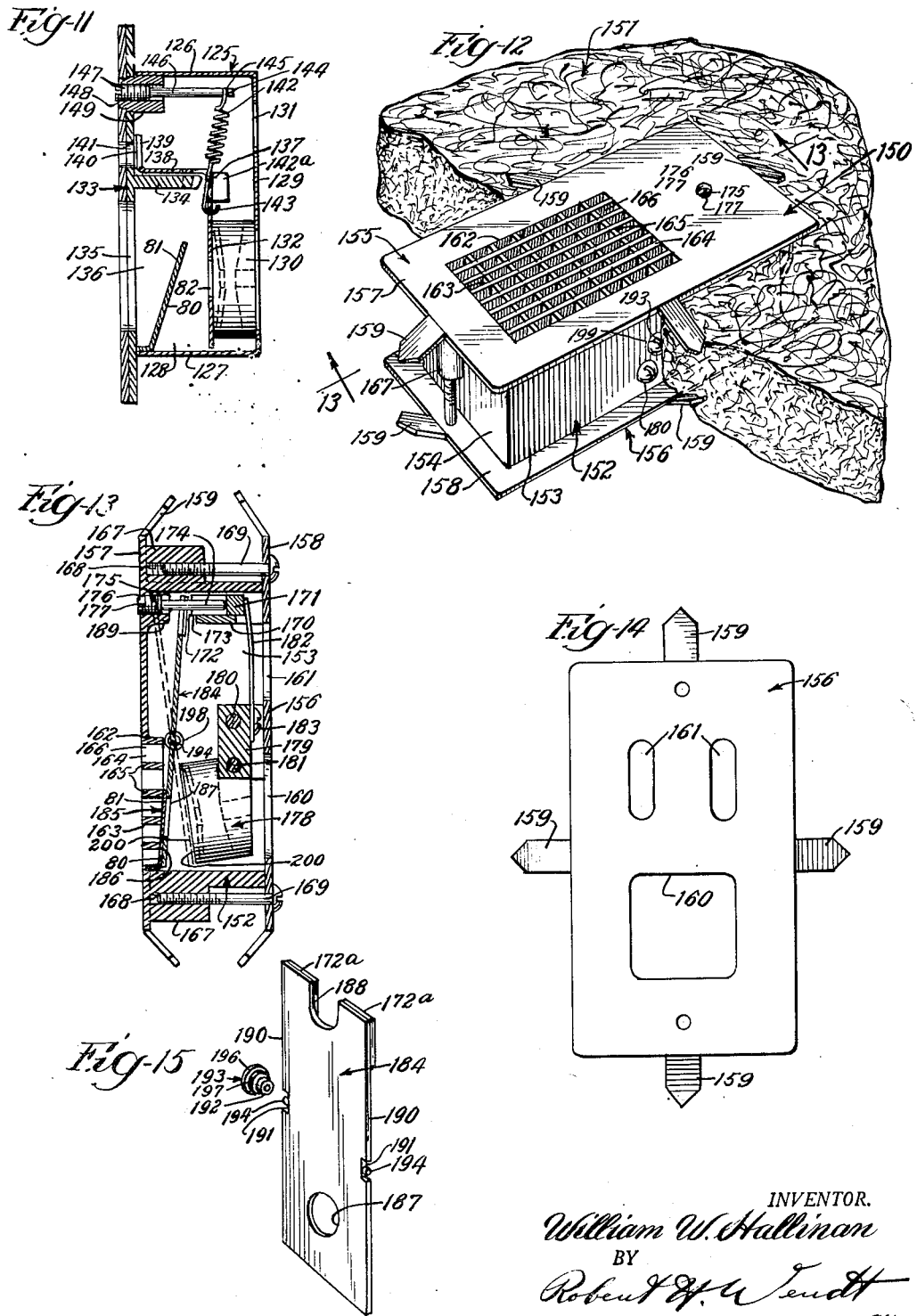

Sept. 3, 1957        W. W. HALLINAN        2,804,839
AIR FILTER ALARM SYSTEMS AND AIR FILTER ALARM UNITS
Filed Dec. 14, 1954        4 Sheets-Sheet 4
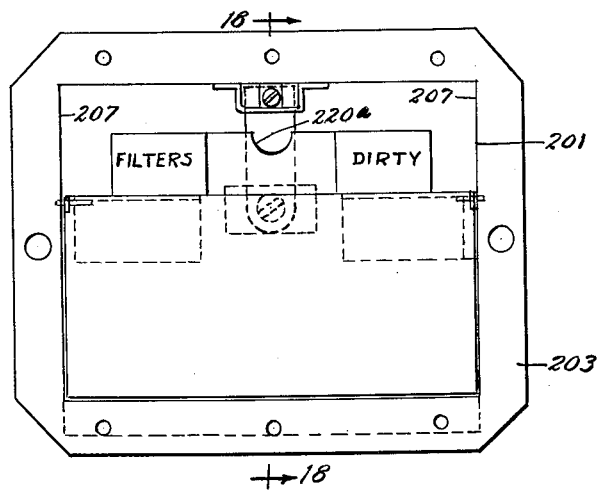
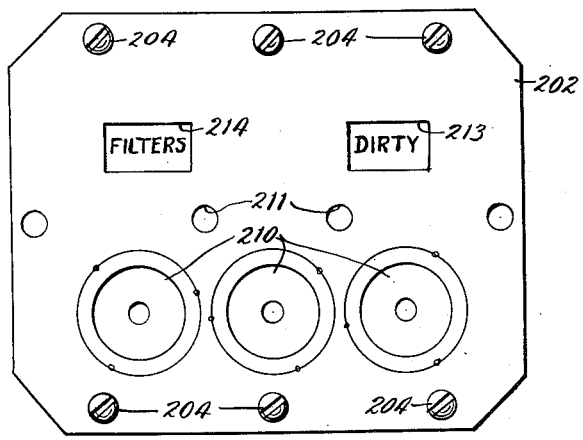
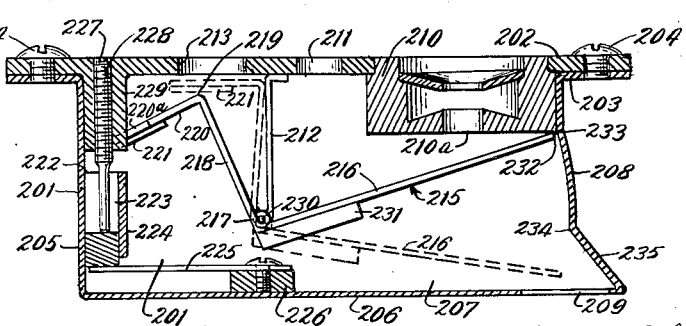
INVENTOR.
William W. Hallinan
BY Robert H. Wendt
Atty.

United States Patent Office 2,804,839
Patented Sept. 3, 1957

2,804,839

AIR FILTER ALARM SYSTEMS AND AIR FILTER ALARM UNITS

William W. Hallinan, Racine, Wis.

Application December 14, 1954, Serial No. 475,208

22 Claims. (Cl. 116—112)

The present invention relates to air filter alarm systems and air filter alarm units, and is particularly concerned with the provision of improved alarm systems and units for use with air enclosures employing air filters, by means of which a definite indication is given of the condition of the filter relative to being clogged or dirty.

When an air filter, which is included in an air circulating system of a heating plant or a cooling plant, becomes clogged the efficient circulation of air is greatly hindered, and practically stopped, producing a number of undesirable results.

For example, the heating plant fails to deliver its maximum amount of heat by failure to deliver the heated air; and a cooling plant fails to deliver its maximum air due to the lack of air circulation through the cooling coils on which ice may start to form.

Due to the restricted air flow through the filters of a cooling plant and the failure to deliver cool air, the cold controls continue to keep the compressor in operation, greatly increasing the running time of the compressor and wasting electrical energy.

Dirty filters involve the delivery of dirty air to the living rooms of the house because some of the dirt works through the filters due to the increased blower suction. Increased operation of the furnace takes place because the clogged filters prevent or hinder the intake of air to be heated, and diminish the delivery of heated air so that the furnace operates for longer periods of time, increasing furnace temperatures and flue gas temperatures, and increasing the possibility of damage to the furnace and waste of fuel.

It is, therefore, fundamental that all such systems involving the circulation of air and filters for cleaning the air, operate at their maximum efficiency only when the filters are new or clean; and the filters should be renewed or cleaned at a time when efficiency begins to fall off rapidly, or certainly at the time when the air flow is greatly impaired.

The object of using air filters is to remove lint and dirt which accumulates in the building and which is carried by the air that is circulated throughout the building and throughout the heating or cooling system. As lint and dirt accumulates in the filters, resistance of the filters to air flow increases.

Most systems involving air flow are designed with a fair factor of safety with regard to air flow, so that some clogging of the filters may be expected while the air flow continues, but there is a point at which the resistance to air flow impairs the efficiency of the system.

The amount of clogging of the air filters may be measured by the air pressure differential existing on the outside and the inside of the wall or housing within which the filter is located, and the pressure at which efficiency falls off rapidly is generally at two tenths inch water glass. By two tenths W. G. I mean the point at which a curved glass tube having its open ends upward and having a predetermined amount of water in the lower U-bend of the glass will show a differential of two tenths inch between the levels of the water subjected to internal pressure and external pressure.

At four tenths W. G., the air flow is so impaired that from fifty to seventy-five percent of the usable heat from a warm air unit is lost up the flue; and in a cooling system the same proportion of electrical energy is lost.

One of the objects of the invention is to notify the user of an air system including filters, by means of a sound signal or other signals, that the filter must be cleaned or replaced with a new one.

Another object of the invention is to notify the user of an air system including filters that the filters are dirty, by giving an audible signal when the resistance through the filters reaches an amount equivalent to two tenths W. G.

Another object of the invention is the saving of fuel in heating systems and the saving of electrical energy in cooling systems, by causing the user to clean or replace filters whenever they have become clogged to a predetermined point.

Another object of the invention is to eliminate service costs caused by improper heating of the building or improper cooling of the building, either or both of which may be brought about by clogging of the filters.

Another object of the invention is the elimination of fire hazards which are increased by an accumulation of dirt in air filters, and the saving of time and expense in house cleaning which is due to dirty filters that permit some of the dirt to work loose and become distributed throughout the house, due to the increased blower suction.

Another object of the invention is to eliminate or reduce the accumulation of water or ice on cooling coils, where the moisture generally freezes and accumulates, stopping all cooling because of insufficient air circulation through the cooling coils due to clogging of filters.

Another object of the invention is to produce and install one unit in which the audible signal and the visual signals are together so the sound will attract the user to the visual signal which will show the filters are dirty.

Another object of the invention is the provision of improved signal devices for indicating the clogging of air filters, which are positive in their action, giving a definite signal at a definite pressure, and bringing the matter of dirty filters to the immediate attention of the user when the filters should be cleaned or replaced, even though the filters are located where they are not readily visible or where the user is not likely to inspect them.

Another object of the invention is the provision of improved alarm devices that will operate in all positions, if they are attached to the filter itself and likely to be placed in any position, and provision of improved alarm devices which are adapted to eliminate the deposit of lint or dirt in the signal device itself by utilizing a valve which close tightly until the alarm signal is to be given, thus eliminating the flow of air through the device, except when the alarm is being given.

Another object of the invention is the provision of improved signal devices including a valve which remains closed until the pressure reaches a predetermined amount and which then is quickly opened, starting the signal and eliminating the possibility of lint or dirt getting in the valve in the partly open position.

Another object of the invention is the provision of a valved air signal having a snap action, so that it moves quickly from the closed position to the open position in which an audible signal is given, and an improved valved signal which is automatic in its action, closing again after the blower stops and the resulting signal stops, so that the signal device is always in condition to shut off the air through the signal and does not have to be reset for this purpose after new filters are installed or the old ones have been cleaned.

Other objects and advantages of the invention will be apparent from the following description and the accompanying drawings, in which similar characters of reference indicate similar parts throughout the several views.

Referring to the drawings accompanying the specification, of which there are four sheets:

Fig. 1 is a diagrammatic illustration of the suction chamber of an air circulation system, such as may be employed merely for cleaning the air and circulating it, or for providing a supply of clean air for an air heating system or an air cooling system, in partial section;

Fig. 2 is a front elevational view of a signal unit of the type which may be employed in the wall of a blower housing, where the unit will always be placed in the same position and does not need balanced parts;

Fig. 3 is a rear elevational view of the signal unit of Fig. 2;

Fig. 4 is a sectional view taken on the plane of the line 4—4 of Fig. 2, looking in the direction of the arrows;

Fig. 5 is a sectional view taken on the plane of the line 5—5 of Fig. 4, looking in the direction of the arrows;

Fig. 6 is a sectional view taken on the plane of the line 6—6 of Fig. 4, looking in the direction of the arrows;

Fig. 7 is a fragmentary sectional view taken on the plane of the line 7—7 of Fig. 6, looking in the direction of the arrows, and showing the details of adjustment of a permanent magnet which accomplishes a snap action of the valve member;

Fig. 8 is a fragmentary sectional view taken on the plane of the line 8—8 of Fig. 5, looking in the direction of the arrows, and showing the pivotal mounting of the valve member;

Fig. 9 is a view in perspective of the valve member which also carries a visible signal in the devices of Figs. 4 to 8;

Fig. 10 is a view in perspective of the visible signal member which is used on the valve member of Fig. 9;

Fig. 11 is a view similar to Fig. 4 of a modification which employs a spring instead of a permanent magnet for snap action;

Fig. 12 is a fragmentary view in perspective showing a signal unit of modified construction installed in and carried by an air filter;

Fig. 13 is a sectional view taken on the plane of the line 13—13 of Fig. 12, looking in the direction of the arrows;

Fig. 14 is a plan view of the rear cover of the unit shown in Fig. 13;

Fig. 15 is a view in perspective of one of the bearings and of the air valve member used in Fig. 13;

Fig. 16 is a front elevational view of a modification with cover removed;

Fig. 17 is a front elevational view of the modification;

Fig. 18 is a vertical sectional view taken on the plane of the line 18—18 of Fig. 16.

Referring to Fig. 1, this is a diagrammatic illustration of a blower housing of the type which may be employed merely for the circulation and filtering of air, or which may form a part of the air circulating system of an air heating plant or an air cooling plant.

The blower cabinet may comprise a box-like housing 20, having four plane sides 21, 22, 23 and 24. The upper end of housing 20 is open at 25, and communicates with an air inlet duct 26.

The floor of the housing supports a centrifugal blower 28, having a centrifugal rotor enclosed in a blower chamber 29, and mounted upon a shaft 30, provided with suitable bearings and with a drive pulley 31, driven by a V-belt 32 engaging the driving pulley 33 of a motor 34.

The blower housing 29 has a circular axial opening 35 at one or both of its ends, and has an air discharge opening at 36 leading to an outlet conduit 37, which may carry air to a heating unit or to a cooling unit, or may deliver the air in its filtered condition to a room or another chamber.

The blower cabinet 20 is separated into an upper space 38 and a lower space 39 by the air filters 40 and 41, which rest upon suitable flanged supports carried by the side walls; and the filter assembly extends completely across the air chamber 38; thus all of the air which passes through the blower cabinet 20 must pass through the filters.

When the filters are clean, which is their condition when they are new, or when they have just been cleaned, there is practically no air pressure difference between the space 38 above the filters and the space 39 below the filters, or between the suction space 39 and the atmosphere outside the housing 20, except the air resistance in the attached duct work which is generally about five one hundredths of an inch.

The present signal devices when installed in a blower housing are preferably located in one of the outer walls, such as the wall 21, in a vertical position, and one such signal device is indicated in its entirety by the number 42.

When the signal device is always installed in the same position it is not necessary to have all of its parts statically or dynamically balanced; but when the signal unit is to be installed and carried by a filter, as shown in Fig. 12, and the filters are also installed in different positions, it becomes desirable and important to have the moving parts of the unit statically and dynamically balanced.

The present signal devices, such as that exemplified in Figs. 2 to 10 and Figs. 16 to 18, are adapted to give both a visible signal and an audible signal, but either of these types of signal may be eliminated without impairing the efficiency of the signal device.

Of the two, the audible signal is the more important because an audible signal is brought to the attention of the user by being carried and magnified in some degree by the metal air conduits extending from the blower housing to all parts of the building.

Thus an audible signal commands immediate attention to the cleaning or replacing of the filters, whereas the visible signal will also indicate to the user when he looks at the signal device that it is the filters that are dirty and require attention.

The present signal devices may be constructed substantially as follows:

The signal device 42 includes a housing 43, which may be molded out of initially plastic material or out of molding powders, and which may have a rear wall 44, integrally joined to upper and lower walls 45, 46, and to the side walls 47, 48.

The open front end 49 of the housing 43 may be closed by a cover plate 50, which has inwardly extending portions 51 fitting in the housing 43, where the cover plate may be secured by suitable screws or other fastening devices.

Cover plate 50 has outwardly extending flange 52 on all of its four sides for engaging the outside of the blower housing wall 21, and limiting the inward movement of the signal unit into the aperture 53, where the unit is secured by screws or bolts in the apertures 64 in flange 52.

The cover plate 50 may be formed with a plurality of slots 55, spaced from each other and forming a grill for the admission of air into the housing 43, when a signal is being given; and the cover plate may be provided with a pair of windows 56, 57, used for exposing a signal member bearing the legends "Filters" and "Dirty," as shown in Fig. 10.

This visible signal member 58 may comprise a strip of sheet material, such as cardboard or aluminum, having a central slot 59 midway between its ends to provide a clearance with respect to a magnet adjusting mechanism.

The slot 59 has a circular bottom 60 and corresponds in shape to a similar slot 61 located in a supporting bracket 62 for this visible signal member, Fig. 9.

The cover plate 50 preferably supports a partition member 63, Fig. 4, which extends from end to end, that is, from left to right in Fig. 2 of the housing 43, and separates the housing into upper and lower air spaces 64, 65.

The partition 63 may form an integral molded part of the cover plate 50, and has an inner beveled edge 66 extending into proximity with the movable valve member 67. The movable valve member 67 has two positions, the closed position shown in dotted lines in Fig. 4, and the open position shown in full lines in Fig. 4.

This movable valve member may comprise a light sheet metal member, such as steel, in the form of a plate, Fig. 9, of rectangular shape, provided with a groove 68 at each of its lateral ends, each groove being provided with a knife edge 69 at its upper side, as shown in Fig. 8.

The housing walls are provided with inwardly projecting lugs 70, adjacent the beveled end of partition 63, and the lugs 70 have V-shaped grooves 71 for receiving the knife edges 69.

The movable valve member may also comprise a sheet of molded plastic material having a pair of pieces of soft iron secured to the bracket 62.

The lugs 70 project inwardly into the grooves 68 only sufficient to provide pivots for the valve member 67 at each end.

Valve member 67 is provided with counterweights 72 on the rear side adjacent the upper edge for counterbalancing the lower portion 73 of the valve plate 67, since the lower portion 73 is longer in a vertical direction.

Valve member 67 is provided with a rectangular groove 74 in its upper edge, the plate being bent forwardly at 75 and provided with a horizontal flange 76 for supporting the bracket 62 which extends vertically.

Bracket 62 supports the signal plate 58, previously described, and carrying the notation that the filters are dirty.

The housing 43 has its lower wall 46 provided with an air baffle or valve seat 77, which is secured to the lower wall 46 by an attaching flange 78 and a plurality of rivets 79.

Baffle 77 extends from end to end of the housing and is provided with a plurality of upwardly extending arms 80, each of which has an integral disc 81, and the discs are located to close the valve apertures 82 in the valve member 67.

When the valve member 67 is in the dotted line position of Fig. 4 the valve plate 67 engages each of the discs 81, and the holes 82 are closed. The entrance of air at the grill openings 55 into the housing 43 is blocked by the valve plate 67, with its apertures 82 closed by discs 81.

When the valve member 67 pivots from the dotted line position to the full line position of Fig. 4, all of the apertures 82 are opened because the valve plate 67 moves away from its contact with the discs 81.

The apertures 82 are larger than the apertures in the whistles 83, 84, and 85, but the centers of these apertures are in alignment with the whistle apertures.

The visible signal plate 58, carried by bracket 62, is elevated above the windows 56 and 57 when the valve member 67 is closed, and in the dotted line position.

When valve member 67 moves to the full line position of Fig. 4, the signal plate 58 pivots down until its legends "Filters" and "Dirty" are exposed in the windows 56 and 57.

Aside from any audible signal the actuation of the valve alone indicates visibly that the filters are dirty and should be cleaned when the valve has moved to open position.

At its upper end the housing 43 is provided with a guide stirrup 86, comprising a U-shaped metal member having both its legs 87 and 88 integral with the top wall 45.

Guide member 86 is rectangular and is adapted to slidably receive the permanent magnet 89 which may be made of a special metal of high coercive force, such as that called "Alnico."

The magnet 89 is of U-shape, having a yoke 90 and two poles 91 and 92, and the pole faces 93 are adapted to be engaged by the faces 94 of the bracket 62, which constitutes an armature.

Bracket 62 carries a pair of thin, light, soft iron pieces 62a which act as the armature, when the valve is not itself made of steel.

The magnet 89 constantly attracts the armature 62 and tends to pull the valve plate 67 to closed position, resisting the opening force that is caused by air pressure on the valve plate 67.

When the air pressure on valve plate 67 reaches a predetermined value, such as, for example, .12 inch W. G., the magnet lets go of the armature and the valve member 67 opens with a snap, producing a positive signal indication.

Part of this signal indication is visual at the signal plate 58, as described, and another part of the signal may be audible, resulting in the production of sound which immediately notifies the user of the fact that the filters are dirty, further to be described.

The magnet 89 is preferably adjustably located in the stirrup 86, which constitutes a guide for its sliding movement.

The back wall 44 of the housing 43 supports a spacer 95, and a leaf spring 96 carried by a through screw bolt 97, that is threaded into the back wall. Leaf spring 96 urges the magnet 89 forward in Fig. 4, or to the left, and downward in Fig. 7, but the motion is resisted by an adjustment screw 98, which determines the adjusted position of the magnet.

Front plate 50 is provided with an integral hub formation 100, surrounding the threaded bore 101. The threaded bore is adapted to receive the adjusting screw bolt 98, which has a threaded end portion 102 and an elongated shank 103.

The end 104 of shank 103 engages inside the yoke 90 of the magnet 89 and holds the magnet in adjusted position.

The strength of the magnet varies depending on its proximity to the armature, and the magnet exerts a maximum pull when it is close to the armature 62, tending to hold the valve member 67 closed.

By means of screw bolt 98 the resistance to movement of the valve member 67 may be adjusted by moving the magnet 89 so that the valve member 67 may be made to open with a snap action at any of a plurality of predetermined air pressures.

The groove 61, which is provided in the armature, enables it to have a clearance with respect to the hub 100. The housing 42 has its back wall provided with the vent apertures 105, 105 for a purpose further to be described. It also has enlarged apertures 107, 108 and 109 for receiving the whistles 83–85.

The three whistles which are provided are merely exemplary of one installation, and some installations may have only one whistle while others include even six or more.

The whistles comprise cylindrical metal members, each of which is provided with a reduced cylindrical portion 110 that is receivable in the apertures 107–109. The whistle is then secured in its special aperture by a staking operation performed at the joint between the whistle and the hole, as shown in Fig. 3.

The body 111 of the whistle is larger than the holes 107–109 and projects inward into the housing and has a cylindrical wall 112. This cylindrical wall is provided with an angular groove 113 for receiving the whistle cover plate 114.

Whistle cover plate 114 has a tight frictional fit in an angular groove 115, located on the side of the wall 112. The whistle cover plate 114 is a shallow cone provided with a central aperture 116.

The body of each of the whistles 83–85 has an inner frusto-conical formation 117 on that side toward the cover plate; and the whistle cover plate 114 has an inwardly projecting frusto-conical surface 118.

The whistle body 111 is relatively thick and has a centrally located enlarged aperture 119, located immediately opposite centrally located circular aperture 116 in the whistle cover plate 114.

The axes of these apertures are in alignment and the inner edges of the apertures surrounding the central holes are definitely spaced from each other and can be varied by the manufacturer for changing the pitch of the whistle.

For example, each of the whistles 83–85 has a different inside spacing between the rim of aperture 116 and the rim of aperture 119. Since the spacing between these whistle apertures determines pitch, the various whistles may be made to cause a signal of different pitch, and each whistle may require a certain range of pressure for actuating the whistle.

The three whistles are so designed and proportioned that one will produce sound at 0.10 inch W. G. but will not sound at 0.30 inch W. G.

A second or central whistle is designed to sound at 0.30 inch to 0.40 inch W. G., but it will not sound at 0.20 inch W. G.

By using three whistles designed to sound at different pressures there will always be a sound when there is pressure in the housing from 0.12 inch throughout the scale up to 0.40 inch W. G.

With three whistles designed to operate on different pressures there will always be from one to two of them sounding at the same time and giving the user a definite signal that the filters must be cleaned or replaced.

The operation of the embodiment of the invention shown in Figs. 1 to 10 is as follows:

In some embodiments of the invention the valve member may be eliminated, and the whistles employed without a valve member to give an audible signal at a pressure which is the result of the clogging of the filter to such an extent that the efficiency of the system begins to deteriorate greatly due to clogging of the filter.

Various installations may have such a resistance to the flow of air in the duct work of the air circulating system that the resistance of the system may amount to twelve hundredths W. G. resistance.

In any case the signals which are employed should be such as to require a greater pressure than that which is normally employed in the system merely for forcing the air through the ducts; and whistles having appropriate critical operating pressures should be employed for every different system.

Assuming that the system has a minimum amount of resistance to flow in the ducts, at about twelve hundredths W. G. pressure the first whistle will sound off with a firm and continuous note, and will continue to perform until the pressure raises to twenty hundredths inch W. G., the two notes overlapping because the whistle for the lower pressure will stop sounding at 0.30 inch W. G.

The second whistle may sound at pressures from 0.20 inch to 0.30 inch, and the third whistle may sound at pressures from 0.30 inch to 0.40 inch.

As the pressure increases the second whistle begins before the first whistle ends, and the third whistle begins before the second whistle ends; thus there will always be one or more whistles sounding and a definite indication will be given that the filters are dirty and need cleaning; and the sound is distributed and amplified somewhat by the air ducts so that it can be heard throughout the house or other building and cannot be ignored.

In the preferred embodiments of the invention the whistles are employed with the valve member as shown in Figs. 1 to 10; and the valve is adapted to be actuated at a definite pressure which is determined by the adjustment of the spacing of the magnet pole faces 93 from the armatures 62.

The closer the magnet is to the armature the greater the pull and the higher the pressure that will be required to pull the armature away from the magnet to open the valve. This critical pressure may be adjusted by adjusting the screw bolt 98, and in many cases it may be adjusted to approximately $\frac{1}{10}$ inch W. G. or 12 hundredths inch W. G.

When enough dirt has accumulated in the filter to increase the pressure difference between the inlet and the outlet side of the filter to the critical pressure for which the valve is set, the air pressure on the valve 67 will cause it to move from the dotted line position of Fig. 4 to the full line position.

This causes the apertures in the valve 67 to come into alignment with the apertures 120, 119, in each of the whistles, and the movement of the valve causes all of the apertures in the valve to be opened because the valve moves away from the discs 81.

As the valve pivots from dotted line position to full line position in Fig. 4, the visible indicator 58 is moved down into registry with the windows 56 and 57; and the legends "Filters" and "Dirty" are exposed in the windows.

At the same time the whistle begins to sound to attract the user and indicate to him that the filters are dirty.

By having a plurality of whistles which sound at different pressures the same device is usable in various systems operating at different pressures.

By adjusting the screw 98, which is accessible through the cover on the outside, the valve opening pressure may be adjusted from ½ inch to five hundredths of an inch W. G.

By use of a plurality of whistles designed to sound at different pressures, there will always be a signal from about 0.12 inch throughout the scale up to 0.40 inch. The whistle which is designed to sound at 0.10 inch W. G. will not sound at 0.30 inch W. G.; and the whistle designed to sound at 0.30 to 0.40 will not sound at 0.20 inch W. G.

In some models a larger number of whistles may be employed, and it is expected to use six or more whistles in one model. Each time the blower is cut off the indicator will return to "off" position, and when new filters are installed or the old ones cleaned, the valve will return to "off" position and no resetting of the device is required. Thus it is entirely automatic in its operation.

The device as shown in Figs. 1 to 4 is adapted to be installed inside the wall of the blower cabinet in a suitable opening so that it is mounted flush; but in some cases if it is installed in a conversion job it may be mounted on the outside of the blower cabinet in which suitable holes registering with the three whistle holes will be drilled, and also a plurality of holes in the upper rear of the housing should register with similar holes drilled in the blower casing.

Referring to Fig. 11, this is a modification designed for installation in the blower cabinet, in which the valve is controlled by a spring instead of a magnet. In this embodiment the device includes a similar rectangular casing 125, having a top 126, a bottom 127, two side walls 128 and a rear wall 129.

The rear wall is provided with a plurality of apertures for mounting the whistles 130 which operate at different pressures and are constructed as described with respect to Fig. 4.

The rear wall 129 has a plurality of vents 131 for increasing the flow of air through the housing and making the valve 132 subject to air pressure which does not have to pass through the whistles.

The housing 125 has its open front closed by the cover 133, which is provided with an inwardly projecting partition 134, preventing air from going through the vents 131 and directing all of the air through the whistles 130.

The cover plate 133 has the same grill slots 135 leading into the lower chamber 136, and the same upwardly extending arms 80, carrying circular plates 81, adapted to close the same openings 82 in the valve 132.

The valve 132 comprises a rectangular plate which is pivoted at 137, and has a forwardly extending portion 138, which is bent up at 139 to carry the same indicator 140 with the legends "Filters" and "Dirty"; and these legends are exposed at a pair of windows 141 when the valve is open, as shown in Fig. 11.

The valve is urged to the closed position by a tension coil spring 142, having one end hooked at 143 in the valve 132, below pivot 137, and having the other end 144 hooked about an annular groove 145 in the smooth shank 146 of the threaded adjustment screw 147, which is mounted in a threaded bore 148 in a lug 149, carried by the cover plate 133. Partition and valve are slotted to clear spring.

The operation of the present unit is substantially the same except that it is urged to closed position by the spring 142, which pulls the valve 132 toward the left against the external air pressure which acts against the reduced suction pressure in the blower cabinet.

142a indicates counterbalance weights, tending to close valve. When the differential of air pressure increases to a predetermined value, depending upon spring adjustment, the air pressure overcomes the counterbalance weights and spring, and opens the valve. When valve opens one or more whistles sound, depending on air pressure. When spring passes line of centers, valve snaps open. When filter is cleaned or blower shut down, counterbalance closes valve with a snap action due to spring, automatically resetting device.

Referring to Figs. 12 to 15, these are views showing a modification in which the signal unit 150 is adapted to be carried by and mounted on one of the filters 40 or 41, the filter element of which is shown at 151, the parts of which are spread apart until a rectangular aperture is formed of sufficient size to receive the rectangular housing 152 of the unit.

The rectangular housing 152 has two sides 153 and two ends 154, and is closed on one side of the filter by a cover plate 155 and on the other side of the filter by cover plate 156.

These cover plates are both of larger size than the dimensions of housing 152, so that each has an overlying flange 157, 158, which extends over the surface of the filter element 151, outside the aperture that has been formed for receiving the rectangular housing 152.

The overlying flanges finish the filter assembly by closing the crack between the housing 152, and the filter element 151, and prevent the air from going through this crack without passing through the filter.

The upper and lower cover plates in Fig. 12 are preferably provided with a plurality of inwardly extending prongs 159, there being at least one prong on each end of each cover plate for being bent inwardly in a diagonal manner into the filter element 151 to draw the filter material over toward the housing 152 and to hold the signal unit in place in the filter.

In Fig. 12 the cover plate 155 is shown in the high pressure side of the filter, that is, on the side toward the chamber 38, and the cover plate 156 is shown on the rear side or suction side which corresponds to the side facing the chamber 39 in Fig. 1. Thus the air will pass in at the cover plate 155 and out of the cover plate 156.

The cover plate 156 is provided with a rectangular aperture 160 for passage of air from the whistle, and with a plurality of apertures 161 leading to the chamber above the whistle.

The cover plate 155, into which the air passes, is provided with a rectangular aperture 162 and with a grill 163, having a multiplicity of longitudinally extending metal strips 164, and a multiplicity of transversely extending metal strips 165, leaving grill apertures 166. The metal strips of the grill 163 direct the air straight toward the whistle which is found to be desirable to secure a good signal, when the signal unit 150 is so placed that the air does not pass through it at right angles.

When signal unit 150 is carried by a filter 151, the filter might be placed in any of a plurality of different positions so that it might be in a position where the air would not be directed toward the whistle, thus producing a minor or faulty signal; but the grill 163 tends to direct the air at right angles to the whistle 178 and directly toward the whistle, so that a satisfactory signal is secured no matter what position the signal unit may occupy.

The housing 152 is preferably molded out of initially plastic compositions or out of molding powders, and the cover plate 155 is provided with integral lugs 167 at each end, having threaded bores 168 for receiving the headed screw bolts 169 which pass through the other cover plate 156 and secure it on the housing.

The cover plate 155 may be integral with the side walls or housing 152 when it is molded. At its upper end housing 153, Fig. 13, is formed with an integral box-like formation 170, Fig. 13, which is open at both ends and is adapted to slidably receive the permanent magnet 171, like the one previously described having its pole faces extending toward the left and indicated at 172.

The legs of the magnet are indicated at 173 and the yoke of the magnet is engaged on the left by the end of a screw bolt 174, having a threaded portion 175 mounted in threaded bore 176. The screw bolt has a slot 177 for a screw driver and it urges the magnet 171 toward the right.

The whistle unit 178 is provided with a mounting block 179, secured to it, and the mounting block is of sufficient length to fit between the side walls 153 of the housing 152, where it is secured by a pair of screw bolts 180, passing through the side walls 153 in each case and threaded bores 181 in the mounting block 179.

Mounting block 179 carries a resilient leaf spring 182, which is mounted by a screw bolt 183, passing through the lower end of the leaf spring and threaded into mounting block 179.

The leaf spring 182 engages the right end of the yoke of permanent magnet 171 and holds the magnet against the end of the adjusting screw 174, so that the magnet is urged toward the left by the spring and toward the right by the screw bolt.

Thus the screw bolt may be screwed in to move the magnet toward the right farther away from the armature or toward the left close to the armature; and the amount of force exerted on the armature by the magnet will depend upon the proximity of the armature to the pole faces 172.

The pole faces 172 should in any event be slightly spaced from the armature end of the valve member 184, so that the valve member may engage the valve closures 185 rather than engaging the end of the magnet to assure closure of the valve.

The grill 163, Fig. 13, has its inner face beveled at 186 and provided with a plane surface which is located at such an angle that it is parallel to the plane of the valve member 184 when the valve is closed; and the rear side of the grill is provided with the valve closure member comprising an upwardly extending plate which may have a neck 80 similar to that shown in Fig. 5; and a disc 81 similar to that shown in Fig. 5, of sufficient size to close an aperture 187 in valve 184, which aperture is larger than the whistle aperture, as shown in Fig. 4, but has its center on the same axis.

Thus the valve member 184 is adapted to have its aperture 187 closed when it is in the full line position of Fig. 13, engaging the disc 81 on the rear side of grill 163, disc 81 being a part of the valve closure 185.

The valve 184 may comprise a substantially rectangular plate of thin magnetic metal or of plastic with a small piece of soft iron or steel cemented to it, and forming the armature 172a, which is attracted to the pole faces 172.

The valve 184 has the aperture 187 and a partially circular slot 188 extending into its upper end and adapted to clear the lug 189, which has the threaded bore 176.

At each side edge 190 of valve member 184, the valve member is provided with a pair of inwardly extending slots 191, the slot providing clearance for the tubular end 192 of a bearing 193; and the slots 191 are arranged on opposite sides of a valve trunnion 194, which is an integral part of the plate and is rounded to fit in the bearing bore 195 of each bearing 193.

Each bearing 193 has the reduced tubular portion 192 that receives the trunnion 194 and that projects into the slots 191, and each bearing has a circular head 196 and a threaded portion 197 of reduced size adapted to be threaded into a threaded bore 198 in each side wall 153.

Each bearing 193 may have a transverse screw driver slot so that it may be driven into the threaded bore 198 of each side wall 153 to engage the trunnions 194 of the valve 184.

As the signal unit 150 carried by a filter may be mounted in any position, it is important that the valve unit 184 be balanced statically and dynamically so that it will not be effected by the forces of gravity acting on it in any position and, therefore, the trunnions 194 are located midway between the ends of the valve member 184 and the slot 188, formed in one end, and aperture 187 formed close to the other end are of such size that they cause the valve member 184 to be balanced with respect to its axis at the trunnions 194.

The whistle unit 178 has its front surface 200 arranged on a plane which extends diagonally as shown in Fig. 13, and is adapted to be parallel to and to contact the right side of the valve member 184 when it is in the open position, which is the dotted line position of Fig. 13.

Thus when the valve is open it engages the whistle unit and has its aperture 187 located for free passage of air through it and through the whistle aperture.

The whistle unit may be substantially as shown in Fig. 4, and is adapted to utter sound when air is passed through it at a pressure of 0.12 inch W. G. for one example, which is the pressure at which the filter begins to reduce the efficiency of the system at an undesirable rate.

The whistle unit 178 can, of course, be arranged by proportioning its parts, as previously described, to operate at any desired pressure, so that it will indicate that the filter is dirty and should be cleaned, by means of the audible sound produced by the whistle unit, and transmitted into the ducts and rooms of the building to be heard by the user.

The present signal unit has all of the advantages of those previously described, and in addition has the advantage that it is statically and dynamically balanced as to its valve member, and it will not be affected by the force of gravity in any position in which the filter may be arranged.

The filter must, of course, be placed with the right side, that is, the grill side, toward the chamber of high pressure, that is, the cover plate 156, toward the chamber of low pressure.

The operation of this signal unit is the same as those previously described. When the filter becomes so clogged that the pressure on the side toward cover plate 155, relative to that on the side 156, equals the critical pressure at which the valve 184 is opened, the air pressure acting on the lower end of valve 184 moves the lower end to the right, pulling the upper end with its armatures 172a away from the magnet 171 to the dotted line position, opening the aperture 187 in the valve which has previously been closed by disc 81.

The valve then moves to the dotted line position with a snap action, effecting a positive and full opening, and permitting the air to move through the grill toward the whistle aperture at right angles and at such pressure as to cause the whistle to emit a whistling sound which will be heard by the user and indicate to him that the filters must be cleaned or replaced.

The pressure at which the valve is actuated may be adjusted by adjusting the screw bolt 174, which varies the pull of the magnet on the armatures 172a, tending to urge the valve to closed position, and releasing the valve at a predetermined air pressure.

The valve is self-closing as its armatures are still within the range of pull of the magnet even when the valve is open; and upon the shutting down of the blower or the change from dirty filters to clean filters, the valve will be automatically closed.

The pressure which actuates the valve is the dynamic pressure of the flowing air against the lower end of the valve 184, which is caused by the air passing in at the grill 163 and out at the aperture 160; and only the lower half of the valve member 184 is exposed by the grill 163 to the pressure of the flowing air, while the top half of the valve 184 is shielded by the cover plate 155, which is closed in front of the upper half of the valve member 184.

Referring to Figs. 16 to 18, these are views showing another modification which differs from those previously described in that the whistles are located on the side toward the incoming air stream, and the valve member is between the whistles and outlet ports of the housing.

In this modification the signal unit includes a casing 201, open at its front end but is closed by a cover plate 202, which overlaps the outwardly projecting border flanges 203 of the casing to which the cover is secured by screw bolts 204.

The casing 201 is generally rectangular in shape, having a plane end wall 205 and a plane rear wall 206, and a pair of plane sides 207, but the end wall 208 is of special shape further to be described.

Rear wall 206 has one or more apertures 209 for passing air into the fan housing when the valve is open. The cover plate 202 may be made of metal or a suitable plastic within which the whistles 210 are anchored by staking in the metal or by molding the plastic around them, and thus the cover plate 202 has suitable apertures within which the whistles are mounted, near the end 208.

The cover plate has a plurality of apertures 211, located just above the whistles and inside the casing 201, below a partition 212 for admitting the air, the pressure of which is to actuate the valve member.

The cover plate also has a pair of rectangular windows 213, 214, located to expose the two legends "Filter" and "Dirty" when the valve is open.

Apertures 209 are much larger than combined area apertures 211 and whistle openings 210a to pass sufficient air to blow the whistles and hold the valve open.

The valve member 215 may comprise a thin member made of sheet material, such as light metal or molded plastic, having a lower plane portion 216 of rectangular shape and having a right angle bend at 217, supporting a transversely extending portion 218, which is bent up at 219 to carry the upwardly extending portion 220 which supports the legends.

The upwardly extending part 220 of the valve member which carries the visible signals has a slot 220a for clearing the screw boss 229.

The upwardly extending part 220 of the valve member may carry a pair of rectangular pieces of soft iron 221, serving as armatures to be attracted by the adjacent poles 222 of the magnet 223.

Magnet 223 slides in a U-shaped stirrup 224, and has its yoke engaged by a leaf spring 225 which is mounted upon a supporting block 226, carried by rear wall 206.

Magnet adjustment screw 227 is located in threaded bore 228 in a boss 229, carried by the cover plate 202, and the end of the screw engages inside the magnet yoke and determines the position of the magnet by its adjustment. This position also determines the air pressure at which the valve will be actuated.

The housing side walls may have apertures serving as bearings for a pintle 230, carried by each edge of the valve member 215 at the right angle bend 217; and 231 indicates counterweights for balancing the valve member 215.

The valve member 215 is rectangular in shape, pivoting on the pintles 230, and its outer edge 232 moves in an arc which determines the shape of the adjacent part of the end wall 208, which is partly cylindrical at 233 to the point 234.

The edge 232 has a clearance but a close fit with the curved wall 233, which prevents air from passing the valve member there.

From the point 234 the end wall 208 has an outwardly flaring straight portion 235 extending to the rear wall 206 with its apertures 209. After the valve member 215 passes the point 234 its outer edge 232 moves away from the end wall 208 and eventually has a clearance as wide as the diameter of the apertures 209, so that air may pass through the apertures 209 between valve member 215 and wall portion 235.

The operation of this modification of the signal unit is substantially the same as those previously described except that the whistles are located outwardly on the unit to receive the incoming air first. However, the whistle apertures are closed by the valve member 215 which extends down behind them, when the valve is closed adjacent the curved wall 233.

When the filters employed in the blower cabinet become clogged the pressure rises to the critical point for which the magnet is set by adjusting the screw bolt 227, and the air impinging on the portion 216 of the valve 215 produces a thrust due to air pressure on a plate which is sufficient to pull the armatures away from the magnet and move the valve member 215 to the dotted line position.

The differential in air pressure of the air entering the apertures 211 outside the blower cabinet and the air inside the blower cabinet, which is under increased suction pressure, causes the valve to move, and thereafter air passes around the end of the valve and the air may pass through the whistles and produce a sound signal which depends upon the pressure required for each whistle and the pressure available.

The present device gives both an audible and a visible signal so that one not familiar with filter requirements will be attracted to the blower by the noise, where he will see the indication stating that the filters are dirty.

The present device is also automatic in resetting itself. When the blower is shut down the signal stops, but it is resumed upon starting the blower unless the filters have been cleaned or replaced with new ones, in which case the present device automatically has its valve moved to the closed position by the magnet.

It will thus be observed that I have invented an improved signal system for indicating the clogging of filters visually and audibly in air heating or air cooling systems, which employ filters with a blower, including a plurality of forms of signal units which are adapted to be actuated at such low pressure differentials that they respond positively and automatically when the filters become clogged to a predetermined degree at which the efficiency of the heating or cooling system deteriorates greatly.

My signal units may be installed as a part of a filter which is likely to be placed in any of various different positions; and in such case the signal unit is preferably balanced statically and dynamically, so that it is unaffected by the force of gravity in any position.

My signal units may also be installed in one of the walls of a cabinet, in which case it has a suitable designation indicating its top, so that the same side may always be installed upward, and the device need not be balanced statically and dynamically.

As distinguished from the devices of the prior art for checking the condition of an air circulating system, those usually require inspection while the device is under operation, but my devices automatically set off an alarm when the filters become dirty and should be replaced or cleaned. They give a sound signal which can be heard in the rooms connected to the ducts of the system, calling the attention of the user to the point from which the sound emanates, where there is a visible indicator signal stating that the filters are dirty.

Since the air pressure in the system which is due to the resistance of the duct work may vary, my signal devices are adapted to be adjusted to various differentials of pressure on the opposite sides of the filter, and are arranged to give audible signals at various different pressures throughout a considerable range of pressures.

My signal devices are preferably provided with valve means for shutting off the air pressure from the whistles or other sound producing members, so that it takes a definite pressure to open the valve and pass air to the audible signal devices, the valve acting with a snap action and preventing the leaking of air which might cause an accumulation of lint or dirt at the point of leakage.

The present signal devices may be manufactured very economically, so that they may be thrown away with the filters that are dirty where it is not practical to clean the filters, and the signal device is installed as a part of the filter.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A filter alarm system comprising, an air enclosure having an air inlet and an air outlet, a blower adapted to take air from the air inlet and to discharge it from said outlet, an air filter extending across said enclosure in such manner as to cause all of the air passing from inlet to outlet to pass through a portion of said filter, a movable signal device located to be subjected on one of its sides to the suction pressure and to be subjected on the other of its sides to a differential of pressure, this differential being negligible when the filter is clean, said signal device having an air pressure actuated signal member which is actuated when the differential of pressure increases a critical amount caused by the clogging of the filter, and giving a signal to the user that the filter should be cleaned or replaced with a new filter, said signal device including a valve member which is actuated by predetermined differential of pressure on the opposite sides of said valve member, the said valve member exhibiting a visible signal that the filter is dirty.

2. A filter alarm system comprising, an air enclosure having an air inlet and an air outlet, a blower adapted to take air from the air inlet and to discharge it from said outlet, an air filter extending across said enclosure in such manner as to cause all of the air passing from inlet to outlet to pass through a portion of said filter, a movable signal device located to be subjected on one of its sides to the suction pressure and to be subjected on the other of its sides to a differential of pressure, this differential being negligible when the filter is clean, said signal device having an air pressure actuated signal member which is actuated when the differential of pressure increases a critical amount caused by the clogging of the filter, and giving a signal to the user that the filter should be cleaned or replaced with a new filter, said signal device including a valve member which is actuated by an increase in the differential of pressure on the opposite sides of said valve member, the said valve member exhibiting a visible signal that the filter is dirty, and snap means for moving said valve member with a snap action from closed to open position responsive to a predetermined pressure.

3. A filter alarm system comprising, an air enclosure having an air inlet and an air outlet, a blower adapted to take air from the air inlet and to discharge it from said outlet, an air filter extending across said enclosure in such manner as to cause all of the air passing from inlet to outlet to pass through a portion of said filter, a signal device located to be subjected on one of its sides to the suction pressure and to be subjected on the other of its sides to a differential of pressure, this differential being negligible when the filter is clean, said signal device having an air pressure actuated signal member which is actuated when the differential of pressure reaches a predetermined amount caused by the clogging of the filter, and giving a signal to the user that the filter should be cleaned or replaced with a new filter, said signal device including a valve member which is actuated by an increase in the differential of pressure on the opposite sides of said valve member, the said valve member exhibiting a visible signal that the filter is dirty, and snap means for moving said valve member with a snap action from closed to open position responsive to a predetermined pressure differential, the said valve member opening a port leading to an air actuated signal member through which the air passes to give a signal to the user, indicating that the filter is dirty.

4. A filter alarm system comprising, an air enclosure having an air inlet and an air outlet, a blower adapted to take air from the air inlet and to discharge it from said outlet, an air filter extending across said enclosure in such manner as to cause all of the air passing from inlet to outlet to pass through a portion of said filter, a signal device located to be subjected on one of its sides to the suction pressure and to be subjected on the other of its sides to a differential of pressure, this differential being negligible when the filter is clean, said signal device having an air pressure actuated valve member which is actuated when the differential of pressure increases a predetermined amount caused by the clogging of the filter, and giving a signal to the user that the filter should be cleaned or replaced with a new filter, the said signal device comprising an air actuated whistle which gives an audible signal and produces the said signal at a critical air pressure.

5. A filter alarm system comprising, an air enclosure having an air inlet and an air outlet, a blower adapted to take air from the air inlet and to discharge it from said outlet, an air filter extending across said enclosure in such manner as to cause all of the air passing from inlet to outlet to pass through a portion of said filter, a signal device located to be subjected on one of its sides to the suction pressure and to be subjected on the other of its sides to a differential of pressure, this differential being negligible when the filter is clean, said signal device having an air pressure actuated valve member which is actuated when the differential of pressure increases a predetermined amount caused by the clogging of the filter, and giving a signal to the user that the filter should be cleaned or replaced with a new filter, the said signal device including a support having a plurality of air whistles, each of said air whistles producing an audible signal by the passage of air at a predetermined pressure through said whistles.

6. A filter alarm system comprising, an air enclosure having an air inlet and an air outlet, a blower adapted to take air from the air inlet and to discharge it from said outlet, an air filter extending across said enclosure in such manner as to cause all of the air passing from inlet to outlet to pass through a portion of said filter, a signal device located to be subjected on one of its sides to the suction pressure and to be subjected on the other of its sides to a differential of pressure, this differential being negligible when the filter is clean, said signal device having an air pressure actuated valve member which is actuated when the differential of pressure increases a predetermined amount caused by the clogging of the filter, and giving a signal to the user that the filter should be cleaned or replaced with a new filter, and an air directing grill for directing the air in a direction at right angles to the signal member.

7. A signal device for use in the blower cabinet of an air distributing system which includes a filter, said signal device comprising, a casing having an outlet opening on one side exposed to suction pressure of air which has passed through the filter, said casing having an inlet opening upon another side exposed to substantially atmospheric pressure, a movable valve member movably mounted in said casing and carrying a visible signal to be exposed when the valve member is actuated, said valve member closing communication between the inlet and outlet of said casing, a predetermined pressure on said valve member moving it from the closed position to an open position when the filter has become sufficiently clogged to produce a predetermined differential of pressure between the inlet and outlet of said cabinet, which indicates substantial impairment of the efficiency of the filter by partial clogging of the filter.

8. A signal device for use in the blower cabinet of an air distributing system which includes a filter, said signal device comprising, a casing having an outlet opening on one side exposed to suction pressure of air which has passed through the filter, said casing having an inlet opening upon another side exposed to substantially atmospheric pressure, a movable valve member movably mounted in said casing and carrying a visible signal to be exposed when the valve member is actuated, said valve member closing communication between the inlet and outlet of said casing, a predetermined pressure on said valve member moving it from the closed position to an open position when the filter has become sufficiently clogged to produce a predetermined differential of pressure between the inlet and outlet of said cabinet, which indicates substantial impairment of the efficiency of the filter by partial clogging of the filter, said valve member including a movable armature and a permanent magnet mounted on said casing and located for said armature to come into proximity of the field of the permanent magnet when the valve is closed, the pressure thrust on said valve member overcoming the pull of the permanent magnet at a predetermined value and releasing said armature to permit said valve member to open with a snap action for positive opening.

9. A signal device for use in the blower cabinet of an air distributing system which includes a filter, said signal device comprising, a casing having an outlet opening on one side exposed to suction pressure of air which has passed through the filter, said casing having an inlet opening upon another side exposed to substantially atmospheric pressure, a movable valve member movably mounted in said casing and carrying a visible signal to be exposed when the valve member is actuated, said valve member closing communication between the inlet and outlet of said casing, a predetermined pressure on said valve member moving it from the closed position to an open position when the filter has become sufficiently clogged to produce a predetermined differential of pressure between the inlet and outlet of said cabinet, which indicates substantial impairment of the efficiency of the filter by partial clogging of the filter, said valve member including a movable armature and a permanent magnet mounted on said casing and located for said armature to come into proximity of the field of the permanent magnet when the valve is closed, the pressure thrust on said valve member overcoming the pull of the permanent magnet at a predetermined value and releasing said armature to permit said valve member to open with a snap action for positive opening, the said armature still remaining in the field of said permanent magnet when the valve is open and subject to the pull of the magnet, which effects a resetting of the valve member and closure of the valve member automatically upon reduction of the actuating pressure, such as occurs when the dirty filter is replaced.

10. A signal device for use in the blower cabinet of an air distributing system which includes a filter, said signal device comprising, a casing having an outlet opening on one side exposed to suction pressure of air which has passed through the filter, said casing having an inlet opening upon another side exposed to substantially atmospheric pressure, a movable valve member movably mounted in said casing and carrying a visible signal to be exposed when the valve member is actuated, said valve member closing communication between the inlet and outlet of said casing, a predetermined pressure on said valve member moving it from the closed position to an open position when the filter has become sufficiently clogged to produce a predetermined differential of pressure between the inlet and outlet of said cabinet, which indicates substantial impairment of the efficiency of the filter by partial clogging of the filter, said valve member including a movable armature and a permanent magnet mounted on said casing and located for said armature to come into proximity of the field of the permanent magnet when the valve is closed, the pressure thrust on said valve member overcoming the pull of the permanent magnet at a predetermined value and releasing said armature to permit said valve member to open with a snap action for positive opening, the said permanent magnet being adjustably mounted for movement toward and from the armature by being biased in one direction by a spring and engaged by an adjustable threaded member, moving the magnet in the opposite direction to vary the pressure at which the value member will be opened.

11. A signal device for use in the blower cabinet of an air distributing system which includes a filter, said signal device comprising, a casing having an outlet opening on one side exposed to suction pressure of air which has passed through the filter, said casing having an inlet opening upon another side exposed to substantially atmospheric pressure, a movable valve member movably mounted in said casing and carrying a visible signal to be exposed when the valve member is actuated, said valve member closing communication between the inlet and outlet of said casing, a predetermined pressure on said valve member moving it from the closed position to an open position when the filter has become sufficiently clogged to produce a predetermined differential of pressure between the inlet and outlet of said cabinet, which indicates substantial impairment of the efficiency of the filter by partial clogging of the filter, said casing including an air actuated signal having a through port for passing air to make an audible signal when the valve is open.

12. A signal device for use in the blower cabinet of an air distributing system which includes a filter, said signal device comprising, a casing having an outlet opening on one side exposed to suction pressure of air which has passed through the filter, said casing having an inlet opening upon another side exposed to substantially atmospheric pressure, a movable valve member movably mounted in said casing and carrying a visible signal to be exposed when the valve member is actuated, said valve member closing communication between the inlet and outlet of said casing, a predetermined pressure on said valve member moving it from the closed position to an open position when the filter has become sufficiently clogged to produce a predetermined differential of pressure between the inlet and outlet of said cabinet, which indicates substantial impairment of the efficiency of the filter by partial clogging of the filter, said casing including an air actuated signal having a through port for passing air to make an audible signal when the valve is open, said valve member having a through aperture registering with said through port when the valve is open, and closed by a fixed plate engaged by the valve member when the valve is closed.

13. A signal device for use in the blower cabinet of an air distributing system which includes a filter, said signal device comprising, a casing having an outlet opening on one side exposed to suction pressure of air which has passed through the filter, said casing having an inlet opening upon another side exposed to substantially atmospheric pressure, a movable valve member movably mounted in said casing and carrying a visible signal to be exposed when the valve member is actuated, said valve member closing communication between the inlet and outlet of said casing, a predetermined pressure on said valve member moving it from the closed position to an open position when the filter has become sufficiently clogged to produce a predetermined differential of pressure between the inlet and outlet of said cabinet, which indicates substantial impairment of the efficiency of the filter by partial clogging of the filter, said casing including an air actuated whistle having a through air passageway leading to said outlet and communicating with said inlet through said valve member when open.

14. A signal device for use in the blower cabinet of an air distributing system which includes a filter, said signal device comprising, a casing having an outlet opening on one side exposed to suction pressure of air which has passed through the filter, said casing having an inlet opening upon another side exposed to substantially atmospheric pressure, a movable valve member movably mounted in said casing and carrying a visible signal to be exposed when the valve member is actuated, said valve member closing communication between the inlet and outlet of said casing, a predetermined pressure on said valve member moving it from the closed position to an open position when the filter has become sufficiently clogged to produce a predetermined differential of pressure between the inlet and outlet of said cabinet, which indicates substantial impairment of the efficiency of the filter by partial clogging of the filter, said signal device including a plurality of whistles arranged side by side, and each having a through air passage, said valve member having an air aperture for each whistle which are closed in the closed position by engagement of the valve member with a fixed closure member.

15. A signal device for use in the blower cabinet of an air distributing system which includes a filter, said signal device comprising, a casing having an outlet opening on one side exposed to suction pressure of air which has passed through the filter, said casing having an inlet opening upon another side exposed to substantially atmospheric pressure, a movable valve member movably mounted in said casing and carrying a visible signal to be exposed when the valve member is actuated, said valve member closing communication between the inlet and outlet of said casing, a predetermined pressure on said valve member moving it from the closed position to an open position when the filter has become sufficiently clogged to produce a predetermined differential of pressure between the inlet and outlet of said cabinet, which indicates substantial impairment of the efficiency of the filter by partial clogging of the filter, said signal device including a plurality of whistles arranged side by side, and each having a through air passage, said valve member having an air aperture for each whistle which are closed in the closed position by engagement of the valve member with a fixed closure member, the said whistles each being actuated to give an audible signal at a different range of pressure, whereby the increased clogging of the filter produces an increased magnitude of sound by actuating a plurality of said whistles.

16. A filter clogging signal device comprising, a casing having an inlet and an outlet for air, an air actuated signal device, a pivoted air valve located between the inlet and outlet to cut off air from said signal device when closed and to open at a predetermined air pressure differential between the inlet and outlet, said valve being urged to closed position by gravity counterbalance, and spring means extending past the valve pivot to cause the valve to snap open or closed, the air pressure differential overcoming counterbalance and spring to open the valve, and counterbalance automatically closing valve on diminished air pressure.

17. A filter clogging signal device comprising, a casing having an inlet and an outlet for air, an air actuated signal device, a pivoted air valve located between the inlet and outlet to cut off air from said signal device when closed and to open at a predetermined air pressure differential between the inlet and outlet, said valve being urged to closed position by gravity counterbalance, said valve comprising a plate having an aperture to pass air through said air signal device when open and cutting off air passage through said casing to said outlet when open to said air signal device, to cause the valve to hold open by air pressure and to give the air signal device full air supply, said outlet subjecting the valve plate to air pressure differential between inlet and outlet when closed, and said plate when in closed position having its aperture closed by a fixed closure member.

18. A filter clogging signal device comprising, a housing having front and rear plates for engaging the opposite sides of an air filter element when the housing is located in an aperture in said element, the said housing having one plate provided with an inlet and the other plate provided with an outlet, an air actuated signal device in said housing, and having a through conduit for passage of air and located between said inlet and outlet, and valve means movably mounted in said housing and balanced statically and dynamically for opening or closing communication between said inlet and outlet through said air actuated signal device at a predetermined differential of pressure on the opposite sides of said filter element.

19. A filter clogging signal device comprising a housing having front and rear plates for engaging the opposite sides of an air filter element when the housing is located in an aperture in said element, the said housing having one plate provided with an inlet and the other plate provided with an outlet, an air actuated signal device in said housing, and having a through conduit for passage of air and located between said inlet and outlet, and valve means movably mounted in said housing and balanced statically and dynamically for opening or closing communication between said inlet and outlet through said air actuated signal device at a predetermined differential of pressure on the opposite sides of said filter element, and snap means for urging said valve member into the closed position and for releasing said valve member from the closed position to the open position at a predetermined pressure.

20. A filter clogging signal device comprising a housing having front and rear plates for engaging the opposite sides of an air filter element when the housing is located in an aperture in said element, the said housing having one plate provided with an inlet and the other plate provided with an outlet, an air actuated signal device in said housing, and having a through conduit for passage of air and located between said inlet and outlet, and valve means movably mounted in said housing and balanced statically and dynamically for opening or closing communication between said inlet and outlet through said air actuated signal device at a predetermined differential of pressure on the opposite sides of said filter element, and snap means for urging said valve member into the closed position and for releasing said valve member from the closed position to the open position at a predetermined pressure, said snap means including an armature carried by said valve member, and a permanent magnet carried by said housing, said armature being released from said magnet at a predetermined pressure to effect snap action of said valve member.

21. A filter clogging signal device comprising, a casing having an inlet and an outlet for air, an air actuated signal device, a pivoted air valve located between the inlet and outlet to cut off air from said signal device when closed and to open at a predetermined air pressure differential between the inlet and outlet, said valve being urged to closed position by gravity counterbalance, said valve comprising a plate having an aperture to pass air through said air signal device when open and cutting off air passage through said casing to said outlet when open to said air signal device, to cause the valve to hold open by air pressure and to give the air signal device full air supply, said outlet subjecting the valve plate to air pressure differential between inlet and outlet when closed, and said plate when in closed position having its aperture closed by a fixed closure member, and a grill having transverse air directing surface for directing air toward said air signal device to secure an adequate signal regardless of direction of air flow toward said grill.

22. A filter clogging signal device comprising, a casing having an inlet aperture and an outlet for air, an air actuated signal device, having an air aperture, a pivoted air valve plate located between the inlet and outlet to cut off air from said signal device when closed and to open at a predetermined air pressure differential between the inlet and outlet, said valve being urged to closed position by gravity counterbalance, said valve comprising a plate opening an aperture in the casing around end of the valve, which is of greater capacity than the apertures for inlet and signal device, to pass air through said air signal device when open, to cause the valve to hold open by air pressure and to give the air signal device full air supply, said outlet subjecting the valve plate to air pressure differential between inlet and outlet when closed, and said plate when in closed position having its end close to a carved wall, said air signal device being located on the inlet side of said casing with the valve controlling air flow on the outlet side of said casing.

References Cited in the file of this patent

UNITED STATES PATENTS

| 2,682,250 | Ulrich | June 29, 1954 |
| 2,750,915 | Carlberg | June 19, 1956 |